United States Patent [19]

Ichikawa

[11] 3,873,611

[45] Mar. 25, 1975

[54] PROCESS FOR THE PREPARATION OF TEREPHTHALIC ACID

[75] Inventor: Yataro Ichikawa, Iwakuni, Japan

[73] Assignee: Teijin Limited, Osaka, Japan

[22] Filed: Oct. 30, 1973

[21] Appl. No.: 411,293

[30] Foreign Application Priority Data

Nov. 6, 1972  Japan............................. 47-110227

[52] U.S. Cl............................................. 260/524 R
[51] Int. Cl....................... C07c 63/02, C07c 63/26
[58] Field of Search ............................... 260/524 R

[56] References Cited
UNITED STATES PATENTS 3,683,017  8/1972  Ager ............................... 260/524 R
3,711,539  1/1973  Koch et al....................... 260/524 R

*Primary Examiner*—Lorraine A. Weinberger
*Assistant Examiner*—Richard D. Kelly
*Attorney, Agent, or Firm*—Sherman & Shalloway

[57] ABSTRACT

In a process for preparing terephthalic acid by oxidizing para-xylene and/or para-toluic acid with a gas containing molecular oxygen in the liquid phase at an elevated temperature in the substantial absence of a lower fatty acid or halogen compound a novel catalyst system is used which comprises a nickel compound and manganese compound, which are at least partially soluble in the reaction mixture, the weight ratio, calculated as metals, of the nickel and manganese being 95:5 – 0.5:99.5. The process gives terephthalic acid in a high yield at a high reaction velocity.

14 Claims, No Drawings

PROCESS FOR THE PREPARATION OF TEREPHTHALIC ACID

This invention relates to process for the preparation of terephthalic acid (TA) by oxidizing para-xylene (PX) and/or para-toluic acid (PTA) with molecular oxygen in the liquid phase, and particularly to a process which us characterized in that the oxidation is carried out in the substantial absence of a lower fatty acid as an oxidation solvent or a halogen compound as an accelerator but by using both a nickel compound and a manganese compound as an oxidation catalyst.

Terephthalic acid is a compound useful as a starting material for the production of fiber- and film-forming polyesters and is being produced in great quantities on a commercial scale.

Numerous methods of producing terephthalic acid by the oxidation of para-xylene or para-toluic acid with molecular oxygen are already known, but all of these known methods have major shortcomings.

For instance, in the case of preparing terephthalic acid by oxidizing para-xylene or para-toluic acid with molecular oxygen in a lower fatty acid solvent such as acetic acid in the presence of a heavy metal catalyst and a bromine compound accelerator (U.S. Pat. No. 2,833,816), the corrosion of the equipment by the bromine compound is pronounced. Hence, the equipment must be made of costly materials such as titanium and, in addition, the useful life of the equipment is short. Again, in the method wherein the oxidation is carried out at a relatively low temperature in a lower fatty acid solvent such as acetic acid by using a cobalt compound catalyst and an accelerator such as methyl ethyl ketone or acetaldehyde (U.S. Pat. Nos. 3,036,122 and 2,673,217), there is the undesirability in that methyl ethyl ketone and acetaldehyde are consumed.

On the other hand, while there is also a method of producing terephthalic acid from para-xylene or para-toluic acid at below 150°C. in an acetic acid solvent by using a cobalt compound catalyst in an exceedingly great amount but without using an accelerator (U.S. Pat. No. 3,334,135), the reaction speed in this case is relatively low and moreover there is the necessity of using the cobalt compound in a great amount.

The hereinabove-described methods are in all cases those in which a lower fatty acid such as acetic acid is used in large amounts. Hence, inconvenience is involved in its control. Not only is the amount produced of terephthalic acid per unit volume of the oxidation apparatus small, but also there is a problem of corrosion of the apparatus by the acetic acid, as well as the problem of the loss resulting from the decomposition of the acetic acid during the oxidation reaction.

The method of preparing terephthalic acid from para-xylene disclosed in British Pat. Specification No. 1,234,009 is believed to excel the aforementioned methods in that neither a lower fatty acid solvent nor an accelerator is used.

As regards a catalyst, the foregoing British Patent specification, page 2, line 127 et seq. state that the preferred catalyst is cobalt or manganese, in the form of a soap, such as a naphthenate, linoleate, phthalate or 2-ethylhexoate, and especially cobalt naphthenate, but other heavy metals may be used.

As is obvious from such description, in the method disclosed in the foregoing British Patent specification cobalt or manganese, especially cobalt is recommended as a metal component making up the catalyst. In fact, only a cobalt component is used as the catalyst in all examples thereof. However, as a result of my investigations, it was found that the rate of formation of the intended terephthalic acid by this method using a cobalt catalyst alone was low and, in addition, that great quantities of numerous by-products such as carbon dioxide, carbon monoxide and high boiling tar-like substances are formed, and consequently, the selectivity for terephthalic acid from para-xylene is low. Further, the discoloration of the oxidation product was pronounced. In consequence, the terephthalic acid obtained by washing the oxidation product by the procedure indicated in said British Patent specification was also discolored considerably. Since the color of a polyester prepared by using discolored terephthalic acid is poor, the terephthalic acid used in preparing fibers or films must have good purity. The terephthalic acid obtained by the method of the foregoing British Patent must undergo a very complicated purification procedure before it can be used as a starting material for the preparation of polyesters.

The object of the present invention is to provide a process which can prepare terephthalic acid not only at a high reaction speed but also at a high selectivity and low degree of discoloration by using para-xylene and/or para-toluic acid as the starting material and conducting the oxidation thereof with molecular oxygen without substantially using a lower fatty acid as a solvent and a halogen compound as an accelerator.

The foregoing object of this invention is achieved by carrying out said oxidation reaction of para-xylene and/or para-toluic acid with a molecular oxygen-containing gas in the liquid phase, 1. in the substantial absence of a lower fatty acid or a halogen compound,
2. in the presence of a nickel compound and a manganese compound, which are at least partially soluble in the reaction mixture, and the weight ratio, calculated as metals, of the cobalt and manganese being 95:5–0.5:99.5, and
3. at a temperature in the range of 160°–280°C.

The foregoing British Pat. Specification No. 1,234,009 discloses that in preparing terephthalic acid from para-xylene in the absence of a lower fatty acid or an accelerator numerous heavy metals can be used as the oxidation catalyst, and that especially to be preferred is cobalt, the sole specific example given being cobalt naphthenate.

According to my investigation, when the activities of representative oxidizing catalysts chosen from numerous heavy metal catalysts were examined, a cobalt catalyst and a manganese catalyst showed excellent activity and the majority of the other catalysts is unable to have better activity than that of the oxidizing catalysts.

Thus, when the activities of various combinations of metals, for example, cobalt-chromium, cobalt-nickel, manganese-chromium, manganese-iron, nickel-chromium, and nickel-vanadium were for the examined, the results were not better than those in the case of cobalt alone or manganese alone.

In accordance with this invention, however, it has been found surprisingly that the conjoint use of the nickel and manganese compounds in carrying out the oxidation of para-xylene and/or para-toluic acid in the substantial absence of a lower fatty acid solvent or a halogen compound accelerator would yield results that are much more superior to the case where these compounds are each used separately or a cobalt compound is used alone.

When the nickel and manganese compounds are conjointly used in the present invention as a catalyst, it becomes possible to prepare at a temperature of 160°–280°C., preferably 180°–250°C., and especially advantageously at a temperature in the range of 190°–230°C., terephthalic acid at a very high reaction speed and high selectivity with a minimum content of impurities which discolor the product.

When the reaction temperature falls to less than 160°C., not only does the speed of formation of terephthalic acid drop greatly but there is also the likelihood of the oxidation product, and especially the terephthalic acid, separating out inside the oxidation reaction apparatus, which in turn results in the clogging of the port from which the molecular oxygen is blown in and the port from which the oxidation reaction product is withdrawn. Hence, there is the possibility that the operation cannot be carried out stably. On the other hand, when the reaction temperature exceeds 280°C., undesirable effects are caused in that not only the speed of formation of terephthalic acid and selectivity therefor drop greatly, but also amounts of by-product impurities which discolor the product increase.

In the present invention the nickel and manganese compounds are used as catalyst combined so that the composition of the foregoing compounds, calculated as respectively nickel and manganese metals, is a weight ratio of cobalt to manganese of 95:5–0.5:99.5, and preferably 90:10–2:98.

The reason is that when the amount of the manganese becomes less than the weight ratio of nickel to manganese, calculated as the nickel and manganese metals, of 95:5, the speed of formation of terephthalic acid becomes small, the discoloration of the oxidation reaction mixture is aggravated, and an abrupt increase takes place in the amounts of decomposition products such as carbon dioxide, carbon monoxide and high boiling tarry substances which cause discoloration of the oxidation reaction mixture. In consequence, the selectivity of the reaction suffers extremely.

On the other hand, when the amount of the manganese exceeds the weight ratio of nickel to manganese of 0.5:99.5, there likewise are such undesirable results as an increase in the discoloration of the oxidation reaction mixture, a decline in the selectivity of the reaction and also a great slowing down of the speed of formation of the terephthalic acid.

Further, it is an advantage in this invention that, along with the use of the composition of the nickel and manganese compounds in range indicated above, the two compounds are used in such amounts that, calculated as nickel and manganese metals, the concentration of these metals in the total oxidation reaction mixture is 0.002–0.5%, and preferably 0.008–0.08% by weight. When the catalyst concentration becomes less than the foregoing amount, it is not desirable, because the speed of formation of terephthalic acid and the selectivity therefor decline and the by-product impurities which cause discoloration of the product increase. On the other hand, when the catalyst concentration exceeds the foregoing range, the speed of formation of and selectivity for terephthalic acid declines. Further, since the amount used of the catalyst increases, it is also economically undesirable.

In this invention, the total concentration of the nickel and manganese compounds is retained as aforementioned. It is desired that the concentration each of the nickel and manganese compounds is in the range of 0.001–0.25% by weight, preferably 0.004–0.04% by weight, calculated as a nickel metal and a manganese metal based on the total oxidation reaction mixture.

As these nickel and manganese compounds, which are used as catalyst in the foregoing proportion in the present invention, any which is at least partially soluble in the reaction mixture will do. Even if these compounds are those which are in themselves difficultly soluble or insoluble in the reaction mixture, so long as they are capable of changing in the reaction mixture to soluble compounds, or at least those which are partially soluble, they can be used. Especially, in the case where the oxidation reaction is carried out continuously in a single vessel while thoroughly mixing the components, the change to the soluble state takes place rapidly because of the high concentration of the aromatic carboxylic acids in the oxidation reaction mixture. Hence, even though the compound is in itself insoluble, it can be used relatively easily. On the other hand, when the reaction is carried out batchwise using para-xylene as the starting material, the addition of a small quantity of para-toluic acid to the para-xylene increases the solubility of the nickel and manganese compounds or accelerates their change to the soluble state. Hence, the induction period of the oxidation reaction is shortened by this desirable addition of the para-toluic acid.

As the nickel and manganese compounds to be used in the present invention, mention can be made of such, for example, as the following:

1. the nickel and manganese salts of aliphatic carboxylic acids of 1–20 carbon atoms such, for example, as formic, acetic, propionic, butyric, stearic, palmitic, oleic, linoleic, adipic and decanedicarboxylic acids;
2. the nickel and manganese salts of aromatic carboxylic acids of 7–20 carbon atoms such, for example, as benzoic, toluic, isophthalic and terephthalic acids;
3. the nickel and manganese salts of alicyclic carboxylic acids of 5–20 carbon atoms such, for example, as naphthenic, cyclohexanecarboxylic and methylcyclohexanecarboxylic acids;
4. the complex salts such as acetylacetonates, methylacetoacetates and ethylacetoacetates of nickel and manganese; and
5. the metals or the various inorganic compounds such as metallic nickel, metallic manganese, and the carbonates, oxides and hydroxides of nickel and manganese.

While preferred examples of the nickel compounds (inclusive of metallic nickel) and the manganese compounds (inclusive of metallic manganese) that can be used as catalyst components in the present invention have been given above, the nickel and manganese compounds usable in the invention are by no means limited to those presented above, but any of the nickel and manganese compounds that are at least partially soluble in the oxidation reaction mixture of the invention are usable.

Of these compounds, especially preferred are the acetates, benzoates, toluates and naphthenates of nickel and manganese. These are not only all readily available but also are all readily soluble in the reaction mixture.

The oxidation reaction in the present invention is preferably performed in the absence of a solvent. However, for simplifying the handling of the oxidation product as a slurry, it may be carried out in the presence of a diluent that is stable under the oxidation conditions, such as benzene, biphenyl or methyl benzoate.

In the oxidation according to this invention, lower fatty acids such as acetic acid, acetic anhydride, propionic acid, and monochloroacetic acid, which are known solvents useful in the conventional oxidation of alkyl-substituted aromatic compounds; or of a halogen or halogen compounds such as bromine or bromine compounds known as promotor, are not used and are unnecessary.

Such lower fatty acid solvents cause corrosion of the equipment at the reaction temperatures at which the subject process is practiced, and also decompose during the oxidation reaction, causing a heavy economic loss.

The halogen or halogen compounds also have the property of causing notable corrosion of the equipment. The impurities derived from the halogen or halogen compounds increase the difficulties in the purification of terephthalic acid.

Accordingly, the use of such a lower fatty acid as solvent or a halogen or halogen compound as promotor are not required in the subject process, and should be positively avoided.

The oxidation reaction according to the invention should be performed under a pressure sufficient to maintain a greater part of the oxidation reaction mixture in the liquid phase. For this reason, pressures of 1–100 kg/cm$^2$G, particularly 2–30 kg/cm$^2$G are preferred. At the lower pressures the rate of oxidation reaction becomes low, and higher pressures increase the cost of building the apparatus.

The molecular oxygen-containing gas used in the present invention as an oxidant includes pure oxygen, air whose oxygen concentration has been raised, or a gaseous mixture of oxygen and an inert gas, say, carbon dioxide and nitrogen, or air. However, of these, air is the most economical and hence desirable. These gases are contacted with the reaction mixture by such procedures as blowing into the reaction mixture, which is in the liquid phase.

It is preferred that the oxidation reaction mixture be stirred by a suitable method such as a forced mechanical agitation or by effecting the agitation by the blowing in of the gas such as a molecular oxygen-containing gas or a combination of these methods or by a combination with other optional methods.

The water formed during the oxidation of the invention may be separated by a suitable method, or it may be recycled to the reaction system by means of, say, a reflux condenser. However, it should be preferably removed from the reaction system by a suitable method.

According to the invention, it is preferred that the oxidation reaction be carried out while controlling the content of the teretphthalic acid, the intended product, such that it does not exceed 60 % by weight, and preferably 45 % by weight, of the reaction mixture. If the reaction is carried out to the point where the content of the terephthalic acid in the oxidation reaction mixture exceeds 45 %, especially 60 % by weight, it becomes difficult to handle the oxidation reaction mixture as a slurry, and hence the operation of the reaction is adversely affected. However, the oxidation reaction is best carried out to the point where the content of terephthalic acid exceeds 10 %, and preferably 15 % by weight; otherwise the amount produced of the terephthalic acid would be too small and it would not be economical.

In the oxidation reaction mixture obtained by the invention process there are contained other than terephthalic acid, the intended product, a considerably large amount of unreacted starting material, intermediates,- by-products and diluents.

For instance, when the oxidation reaction is carried out in the absence of a diluent, the oxidation reaction mixture contains in addition to the intended terephthalic acid and the unreacted para-xylene and para-toluic acid, such intermediates as para-tolualdehyde, para-formylbenzoic acid and para-methylbenzyl alcohol and such by-products as high boiling tar-like substances.

According, it is preferred in this invention that the intended terephthalic acid be separated and recovered from the oxidation reaction mixture if necessary, after carrying out its purification, while the unreacted starting material and the intermediates other than terephthalic acid be recycled to the oxidation reaction step.

In the separation of this terephthalic acid, the various conventional solid-liquid separation methods such as filtration or centrifugation can be employed.

In performing such solid-liquid separation, a suitable pre-treatment is preferred in order to carry out the separation smoothly.

For example, British Pat. Specification No. 1,234,009 suggests washing the oxidation reaction product with para-xylene at above 250°C., and preferably 290°–300°C..

According to the investigations of the present inventor, it was found that when the oxidation reaction of this invention was carried out at a temperature of 230°C. or below, and the resulting oxidation reaction mixture was treated at a temperature exceeding 230°C., preferably 230°–270°C., especially 235°–260°C. (hereinafter to be referred to as an elevated temperature treatment), after which solid terephthalic acid was separated from the oxidation reaction mixture, terephthalic acid having a low degree of discoloration and a high purity could be obtained easily.

The treatment time of the elevated temperature treatment, i.e., the period of time during which the oxidation reaction mixture is held at the elevated temperature, is from 10 minutes to 50 hours, and preferably 30 minutes to 10 hours, although varying depending upon the temperature and other conditions. When the treatment time is too short, fully satisfactory results cannot be obtained. On the other hand, when the treatment time is too long, not only is it a disadvantage economically, but also the discoloration of the terephthalic acid increases.

When the oxidation reaction in the present invention is carried out at a temperature exceeding 230°C., the performance of said elevated temperature treatment is not required especially. However, even in this case, it is possible, of course, and sometimes preferable, to effect said elevated temperature treatment by maintaining said oxidation reaction product at a temperature exceeding 230°C., especially at a temperature higher than that of the oxidation reaction, if required, after said oxidation reaction.

After completion of the elevated temperature treatment, the solid terephthalic acid is isolated from the oxidation reaction mixture. In carrying out the isolation of the terephthalic acid, the various conventional solid-liquid separation methods such as filtration, centrifugation, etc., can be employed. The solid-liquid separation may be carried out at a temperature at which the elevated temperature treatment was carried out or it may be carried out after cooling the oxidation reaction mixture to an extent as will not impair its fluidity. Again, the solid-liquid separation may be carried out after first admixing a solvent such as benzene, toluene, xylene, methanol or ethanol with the elevated temperature-treated reaction product. When a solvent has been used in this manner, the liquid side, before being returned to the oxidation step, is best removed of a major portion of its solvent by such means as distillation. The use of para-xylene as the solvent is to be preferred commercially. For instance, the procedure of mixing para-xylene with the elevated temperature-treated oxidation reaction mixture to cool and dilute it followed by carrying out the solid-liquid separation step is a practically desirable method. The terephthalic acid obtained by the solid-liquid separation may then be further washed in a solvent, say, para-xylene. When the oxidation product (reaction mixture) is submitted to its solid-liquid separation in the manner described hereinabove under properly selected conditions, white terephthalic acid crystals more than having 99 % are readily obtained and, at the same time, the unreacted starting material and intermediates contained in the oxidation product are recovered in the liquid side and are readily recycled to the oxidation step of the present invention.

The so obtained terephthalic acid is fully satisfactory for use in, say, the manufacture of the alkyd resins or the synthesis of bis-beta-hydroxyethyl-terephthalate by reacting it with ethylene oxide.

The aforesaid oxidation reaction of the invention can be carried out either continuously or batchwise.

Thus, as hereinbefore described, the present invention possesses very excellent advantages in that by operating in accordance therewith and using as catalyst both the nickel and manganese compounds in a specific proportion and without using the lower fatty acid solvent or an accelerator such as the halogen compounds, it is possible to obtain terephthalic acid at a high rate of selectivity and fast reaction speed and moreover with the degree of discoloration of the resulting terephthalic acid being small.

When the oxidation reaction in the present invention is carried out at 190°–250°C., especially at 190°–230°C., it is possible to obtain terephthalic acid of a lower degree of discoloration in a high yield than in the case of using the cobalt compound alone, manganese compound alone, or both of the cobalt and manganese compounds.

The following examples will be given for more fully illustrating the invention.

EXAMPLE 1

A 500-cc titanium autoclave equipped with a reflux condenser, a stirrer and a gas blow inlet was charged with 200 grams of para-xylene and 5 grams para-toluic acid, after which nickel, acetate, manganese acetate and cobalt acetate containing Ni, Mn and Co in a proportion indicated in the following Table 1 were added. This was followed by blowing in air at a temperature of 200°C. and a pressure of 15 kg/cm² gauge such that the rate of flow of air at the outlet would be 3000 cc/min., while agitating the reactants at high speed, the reaction being carried out for 2 hours after the absorption of oxygen started. After completion of the reaction, the oxidation reaction mixture was withdrawn, and its weight and the content of terephthalic acid were determined. The speed of formation of terephthalic acid (to be abbreviated as TA hereinafter) was then calculated as follows:

$$\text{Speed of formation of TA} = \frac{\text{Weight (g) of reaction mixture withdrawn} \times \text{TA content (wt\%)}}{\text{Reaction time (hr)} \times 100}$$

Further, the carbon dioxide and carbon monoxide in the spent gas were analyzed, and the rate of decomposition loss was calculated as follows:

$$\text{Rate of decomposition loss} = \frac{\text{Carbon dioxide (mmol)} + \text{Carbon monoxide (mmol)}}{\text{Weight (g) of TA formed}}$$

Further, for comparing the amount of discoloring impurities, 0.1 gram of the oxidation mixture was dissolved in 40 cc of dimethylformamide, and this was placed in a color comparison tube and the Hazen number (American Public Health Association Number) was determined.

Table 1

| Run | Amount of catalyst added (mg) | | Ni : Mn (weight ratio) | Speed of TA formation (g/hr) | Degree of discoloration (Hazen number) | Decomposition loss (mmol/g) | Remarks |
|---|---|---|---|---|---|---|---|
| | Ni | Mn | | | | | |
| 1-a | 120 | 0 | 100:0 | 3.9 | 500 | 43.2 | Comparison |
| 1-b | 118 | 2 | 98.3:0.7 | 4.7 | 250 | 24.6 | do. |
| 1-c | 114 | 6 | 95:5 | 7.9 | 200 | 13.8 | Example |
| 1-d | 108 | 12 | 90:10 | 14.7 | 120 | 7.7 | do. |
| 1-e | 95 | 25 | 79.2:20.8 | 16.6 | 100 | 6.4 | do. |
| 1-f | 60 | 60 | 50:50 | 26.4 | 40 | 3.7 | do. |
| 1-g | 25 | 95 | 20.8:79.2 | 26.0 | 70 | 4.0 | do. |
| 1-h | 2.4 | 117.6 | 2:98 | 19.7 | 100 | 6.0 | do. |
| 1-i | 0.6 | 119.4 | 0.5:99.5 | 14.5 | 120 | 8.6 | do. |
| 1-j | 0 | 120 | 0:100 | 6.6 | 150 | 26.1 | Comparison |
| 1-k | Co | 120 | — | 5.1 | 100 | 38.0 | do. |

As the reaction time each of the experiments in Example 1 mentioned above is constant, the speed of TA formation constitutes a good measure for the conversion of the starting material. The decomposition loss constitutes a good measure for the selectivity of TA to para-xylene consumed.

temperatures shown in Table 2, and a pressure of 20 kg/cm$^2$G, and the reaction was carried out for 2 hours. The rate of decomposition loss, the degree of discoloration and the speed of formation of TA were then determined as in Example 1. The conditions of the experiments and the results obtained are shown in Table 2.

Table 2

| Run | Temperature (°C) | Speed of TA formation (g/hr) | Degree of discoloration (Hazen number) | Decomposition loss (mmol/g) | Remarks |
|---|---|---|---|---|---|
| 2-a | 136 | 0 | — | — | Comparison |
| 2-b | 150 | 0.7 | 80 | 47.9 | do. |
| 2-c | 160 | 5.2 | 60 | 13.9 | Example |
| 2-d | 180 | 10.8 | 50 | 10.1 | do. |
| 2-e | 190 | 23.3 | 50 | 4.3 | do. |
| 2-f | 200 | 27.0 | 40 | 3.6 | do. |
| 2-g | 220 | 28.6 | 50 | 2.8 | do. |
| 2-h | 230 | 28.2 | 50 | 2.5 | do. |
| 2-i | 240 | 27.3 | 60 | 3.0 | do. |
| 2-j | 260 | 25.1 | 80 | 3.5 | do. |
| 2-k | 280 | 18.9 | 160 | 5.4 | do. |
| 2-l | 290 | 4.8 | 350 | 18.8 | Comparison |

For example, when the selectivity is expressed by mol percentage of TA formed per mole percentage of para-xylene consumed, the selectivities in Runs Nos. 1-a, 1-f, 1-j, and 1-k in said Table 1 become 4.5 %, 27.5 %, 7.0 %, and 5.3 %, respectively. These selectivity value have the same tendency to that of the values of decomposition losses. That is, when the decomposition loss becomes large, the selectivity becomes small. Conversely, when the decomposition loss is small, the selectivity becomes large.

EXAMPLE 2

The same autoclave as that used in Example 1 was charged with 200 grams of para-xylene, 5 grams of para-toluic acid, and nickel acetate containing 50 milligrams of Ni and manganese acetate containing 50 milligrams of Mn. This was followed by blowing air so that the rate of flow of air at the outlet was 3000 c.c./min while rapidly agitating the reaction mixture at various

EXAMPLE 3

Example 1 was repeated except that the reaction was carried out using instead of nickel acetate and manganese acetate various other nickel and manganese compounds as catalyst. The amounts of the catalysts added were, calculated as Ni and Mn, each 60 milligrams. The results obtained are shown in Table 3, below.

Table 3

| Run | Form of catalyst Nickel | Form of catalyst Manganese | Speed of TA formation (g/hr) | Degree of discoloration (Hazen Number) | Decomposition loss (mmol/g) |
|---|---|---|---|---|---|
| 3-a | nickel naphthenate | finely divided metallic manganese | 25.8 | 100 | 7.4 |
| 3-b | nickel benzoate | manganese naphthenate | 26.3 | 90 | 7.1 |
| 3-c | nickel toluate | manganese carbonate | 25.9 | 90 | 7.0 |
| 3-d | nickel naphthenate | manganese acetyl- | 26.0 | 100 | 7.2 |

EXAMPLE 4

A 500-cc stainless steel autoclave having the same structure as that in Example 1 was charged with 200 grams of para-xylene, 5 grams of para-toluic acid, and nickel acetate and manganese acetate containing Ni and Mn in amounts shown in Table 4 below. This was followed by blowing air so that the rate of flow of air at an outlet was 2,500 cc/min while rapidly agitating the reaction mixture at a pressure of 20 kg/cm$^2$G and a temperature of 200°C., and the reaction was carried out for 2.5 hours. The rate of decomposition loss, the degree of discoloration, and the speed of TA formation were determined as in Example 1. The results obtained are shown in Table 4 below.

Table 4

| Run | Concentration of Ni + Mn in oxidation reaction mixture (wt%) | Amount of catalyst added (mg) Ni | Amount of catalyst added (mg) Mn | Speed of TA formation (g/hr) | Decomposition loss (mmol/g) | Degree of discoloration (Hazen Number) |
|---|---|---|---|---|---|---|
| 4-a | 0.001 | 1.2 | 1.2 | 5.1 | 12.8 | 300 |
| 4-b | 0.002 | 2.3 | 2.3 | 8.6 | 7.3 | 200 |
| 4-c | 0.005 | 6.0 | 6.0 | 16.7 | 5.8 | 150 |
| 4-d | 0.008 | 9.6 | 9.6 | 22.8 | 4.9 | 100 |
| 4-e | 0.03 | 36.4 | 36.4 | 25.8 | 3.6 | 40 |
| 4-f | 0.08 | 96.6 | 96.6 | 23.5 | 3.8 | 60 |
| 4-g | 0.2 | 238 | 238 | 15.4 | 4.5 | 80 |
| 4-h | 0.5 | 588 | 588 | 10.3 | 6.1 | 120 |
| 4-i | 1.0 | 1168 | 1168 | 6.7 | 10.9 | 200 |

EXAMPLE 5

A high pressure reaction container equipped with an exhaust gas condenser, a stirrer, and a gas blow inlet was charged with 2,000 grams of para-xylene, 30 grams of para-toluic acid, 2.15 grams of nickel acetate, and 2.25 grams of manganese acetate. This was followed by blowing air while rapidly agitating the reaction mixture at a temperature of 200°C. and a pressure of 20 kg/cm$^2$G, and the reaction was carried out for 2.5 hours. After completion of the reaction, the product was cooled, and withdrawn. Substances of low boiling point such as unreacted para-xylene were removed by distillation, thereby to obtain an oxidation product.

100 grams of the oxidation product was placed in a flask equipped with a reflux condenser and maintained at various elevated temperatures shown in Table 5 below for 3 hours while agitating it slowly with a glass agitating rod at normal atmospheric pressure. Then, the product was cooled to 200°C. and further to 135°C. while dropping 200 grams of para-xylene, and filtered by means of a glass filter heated in advance. After filtration, the cake was placed in the flask and 200 grams of para-xylene was added. The mixture was agitated slowly at 100°C. for 10 minutes and filtered again by means of the glass filter. The cake obtained was dried and the weight, impurity content, and color thereof were measured. The results obtained are shown in Table 5.

500 grams of the mixture was added to the oxidation product which had been cooled to 200°C., and the oxidation product was simultaneously cooled to 135°C. It was filtered by means of a glass filter heated in advance. At that time, most of intermediate products such as para-toluic acid were recovered in the filtrate. On the other hand, the cake was charged to a flask and 500 grams of para-xylene was added. The mixture was agitated slowly at 100°C. for 10 minutes and filtered again by means of a glass filter. When the cake was dried, 63 grams of TA was obtained. The filtrate was distilled after combined with the filtrate obtained in the first filtration, and the majority of para-xylene was recovered as a fraction of distillate, and 252 grams of residue was obtained. The residue consisted mainly of para-toluic acid and para-xylene, further including intermediate products such as para-tolualdehyde, para-formyl benzoate, and para-methylbenzyl alcohol, by-products such as tar-like substances of high boiling point, small amounts of TA and catalysts of Ni and Mn. The residue was charged again to the autoclave and the oxidation reaction was carried out as in the foregoing case. The similar after-treatment was performed to obtain 243 grams of residue containing 8 grams of TA, intermediate products, etc. This procedure was repeated twice to obtain TA in an amount of 76 grams and 79 grams. A sample was taken out after the total weight 299 grams of TA obtained was mixed well. The content of impurities was measured, with the consequence that Table 5

| Run | Temperature (°C) | Amount of TA obtained (gr) | Color of TA | Impurity content | | |
|---|---|---|---|---|---|---|
| | | | | para-tolualdehyde | PTA | para-formyl benzoate |
| 5-a | 290 | 36 | yellow brown | not detected | 0.2 | 0.2 |
| 5-b | 260 | 36 | whitish yellow | do. | 0.1 | 0.1 |
| 5-c | 240 | 36 | white | do. | 0.1 | 0.2 |
| 5-d | 230 | 36 | do. | do. | 0.2 | 0.1 |
| 5-e | 210 | At first filtration, the glass filter was clogged and the filtration became impossible. | | | | |

EXAMPLE 6

The same autoclave as that used in Example 1 was charged with 200 grams of para-xylene, 5 grams of para-toluic acid, nickel acetate containing 60 milligrams of Ni and manganese acetate containing 60 milligrams of Mn. This was followed by blowing air so that the rate of flow at an outlet was 2,500 cc/min while rapidly agitating the reaction mixture at a temperature of 200°C. and a pressure of 20 kg/cm$^2$G, and the reaction was carried out for 2.5 hours. The product was cooled after completion of the reaction and the product was taken out. Substances of low boiling point obtained consisting mainly of unreacted para-xylene as a principal component were removed by distillation. The remaining oxidation product was charged to a flask equipped with a reflux condenser and maintained at an elevated temperature of 240°C. for 3 hours while agitating at normal atmospheric pressure by means of a glass agitating rod, after which the product was cooled to 200°C. Para-xylene was added to the low-boiling substances consisting principally of unreacted para-xylene, and the total weight was adjusted to 500 grams.

only 0.1 % by weight of para-toluic acid and 0.2 % by weight of para-formyl benzoate were contained and para-tolualdehyde, para-methyl benzylalcohol, etc. could not be found. The resulting TA was white.

EXAMPLE 7

The same autoclave as that used in Example 1 was charged with 200 grams of para-xylene, 5 grams of para-toluic acid, and a mixture of cobalt acetate or nickel acetate and manganese acetate containing Co, or Ni and Mn in amounts shown in Table 6 below. This was followed by blowing air so that the rate of flow of air at an outlet was 1,500 cc/min while rapidly agitating the mixture at various temperatures shown in Table 6 below and a pressure of 15 kg/cm$^2$G, and the reaction was carried out for 3 hours. The rate of decomposition loss, the degree of discoloration, and the speed of TA formation were determined as in Example 1. The conditions and the results of the experiments are shown in Table 6 below.

Table 6

| Run | Amount of catalyst added (mg) | | | Temperature (°C) | Decomposition loss (mmol/g) | Degree of discoloration (Hazen Number) | Speed of TA formation (g/hr) |
|---|---|---|---|---|---|---|---|
| | Co | Ni | Mn | | | | |
| 7-a | 100 | 0 | 0 | 170 | 12.3 | 400 | 7.4 |
| 7-b | 0 | 50 | 50 | 170 | 12.0 | 50 | 7.6 |
| 7-c | 100 | 0 | 0 | 180 | 17.8 | 450 | 5.8 |
| 7-d | 0 | 50 | 50 | 180 | 9.7 | 50 | 10.5 |

EXAMPLE 8

The same autoclave as that used in Example 1 was charged with 200 grams of para-xylene, 5 grams of para-toluic acid, and acetic acid salt of metal shown in Table 7 below. This was followed by blowing air so that the rate of flow of air at an outlet was 3,000 cc/min while rapidly agitating the mixture at a temperature of 220°C., and a pressure of 30 kg/cm²G, and the reaction was carried out for 2 hours. The rate of decomposition loss, the degree of discoloration, and the speed of TA formation were determined as in Example 1. The conditions and the results of the experiments are shown in Table 7 below.

Table 7

| Run | Amount of catalyst added (mg) | Decomposition loss (mmol/g) | Degree of discoloration (Hazen Number) | Speed of TA formation (g/hr) | Remarks |
|---|---|---|---|---|---|
| 8-a | Ni (50) + Mn (50) | 2.9 | 50 | 28.8 | Example |
| 8-b | Ni (50) + Co (50) | 29.6 | 500 or above | 3.4 | Comparison |
| 8-c | Fe (50) + Mn (50) | 20.4 | 300 | 7.2 | do. |
| 8-d | Cr (50) + Mn (50) | 26.0 | 400 | 8.5 | do. |
| 8-e | Cr (50) + Co (50) | 32.3 | 250 | 4.5 | do. |

What I claim:

1. In the process for the preparation of terephthalic acid by oxidizing para-xylene and/or para-toluic acid with a molecular oxygen-containing gas in the liquid phase, the improvement which comprises carrying out said oxidation reaction
   1. in the substantial absence of a lower fatty acid or halogen compound;
   2. in the presence of a catalyst consisting essentially of a nickel compound and a manganese compound, which are at least partially soluble in the reaction mixture, the weight ratio, calculated as metals, of the nickel and manganese being 95:5–0.5.95.5; and
   3. at a temperature in the range of 160°–280°C.

2. The process according to claim 1 wherein the sum total amount of the nickel and manganese, calculated as metals, present in the total oxidation reaction mixture is 0.002–0.5 % by weight.

3. The process according to claim 1 wherein the sum total of the nickel and manganese, calculated as metals, present in the total oxidation reaction mixture is 0.008–0.08 % by weight.

4. The process according to claim 1 wherein the weight ratio, calculated as metals of the nickel and manganese contained in the total oxidation reaction mixture is 90:10–2:98.

5. The process according to claim 1 wherein said oxidation is carried out at a temperature in the range 170°–250°C.

6. The process according to claim 1 wherein said oxidation is carried out at a temperature in the range of 190°–230°C.

7. The process according to claim 1 wherein comprises oxidizing para-xylene in the liquid phase with molecular oxygen-containing gas to prepare the terephthalic acid.

8. The process according to claim 1 wherein said oxidation reaction is carried out in the substantial absence of a solvent or a diluent.

9. The process according to claim 1 wherein said oxidation reaction is made to proceed while adjusting to content of the terephthalic acid in the oxidation reaction mixture such that it does not exceed 60 % by weight.

10. The process according to claim 1 wherein when said oxidation reaction is carried out at a temperature of 230°C. or below, the oxidation reaction mixture obtained is treated at an elevated temperature of 230°C.–270°C. and solid terephthalic acid is separated from the oxidation reaction mixture.

11. The process according to claim 10 wherein said elevated temperature treatment is carried out after unreacted para-xylene contained in the oxidation reaction mixture has been removed.

12. The process according to claim 10 wherein said elevated temperature reaction is carried out for 10 minutes to 50 hours.

13. The process according to claim 10 wherein a solvent is added to said oxidation reaction mixture after said elevated temperature treatment, and thereafter solid terephthalic acid is separated.

14. The process according to claim 13 wherein para-xylene is used as said solvent.

* * * * *